US010810551B2

(12) United States Patent
Nagaoka et al.

(10) Patent No.: US 10,810,551 B2
(45) Date of Patent: Oct. 20, 2020

(54) PROJECT MANAGEMENT SUPPORT SYSTEM, PROJECT MANAGEMENT SUPPORT METHOD, AND NON-TRANSITORY COMPUTER READABLE MEDIUM STORING A PROJECT MANAGEMENT SUPPORT PROGRAM

(71) Applicant: MITSUBISHI ELECTRIC CORPORATION, Chiyoda-ku, Tokyo (JP)

(72) Inventors: Hiroshi Nagaoka, Tokyo (JP); Takao Okura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 101 days.

(21) Appl. No.: 16/069,922

(22) PCT Filed: Mar. 7, 2017

(86) PCT No.: PCT/JP2017/009030
§ 371 (c)(1),
(2) Date: Jul. 13, 2018

(87) PCT Pub. No.: WO2017/154914
PCT Pub. Date: Sep. 14, 2017

(65) Prior Publication Data

US 2019/0026698 A1 Jan. 24, 2019

(30) Foreign Application Priority Data

Mar. 10, 2016 (JP) ................................ 2016-047577

(51) Int. Cl.
*G06Q 10/10* (2012.01)
*G06Q 10/06* (2012.01)

(52) U.S. Cl.
CPC .......... *G06Q 10/103* (2013.01); *G06Q 10/06* (2013.01); *G06Q 10/0635* (2013.01)

(58) Field of Classification Search
CPC .............................. G06Q 10/00; G06Q 50/00
(Continued)

(56) References Cited

U.S. PATENT DOCUMENTS 7,523,135 B2 * 4/2009 Bradford ............... G06Q 10/06
7,536,405 B2 * 5/2009 Tschiegg ............... G06Q 40/08
(Continued)

FOREIGN PATENT DOCUMENTS

JP 2003-150761 A 5/2003
JP 2006-134101 A 5/2006
(Continued)

OTHER PUBLICATIONS

Clarity, Functional Overview of CA Clarity Project and Portfolio Management System, 2006 http://www. nextret. net/ficheros/2053. pdf (Year: 2006).*
(Continued)

*Primary Examiner* — Alan S Miller
(74) *Attorney, Agent, or Firm* — Buchanan Ingersoll & Rooney PC

(57) ABSTRACT

In a project management support system, a ratio calculation unit calculates, as an “FL rate of project management”, a ratio of the number of measures recorded in a risk measure to-do list to a sum of the number of problems recorded in a problem management table and the number of measures recorded in the risk measure to-do list. An achievement level calculation unit calculates a level of goal achievement for the “FL rate of project management” from a calculation result by the ratio calculation unit and a target value of the “FL rate of project management”. A display control unit sets a display mode of the calculation result by the ratio calcu-
(Continued)

START
S21 EXTRACT CONCERN BY REFERRING TO PROBLEM IN PAST SIMILAR PROJECT
S22 EXTRACT ALL CONCERNS AND ANXIETIES OF ALL PROJECT MEMBERS
S23 CREATE LIST OF CONCERNS
S24 PRESS AGREE BUTTON OR DENY BUTTON FOR EACH CONCERN BY EACH PROJECT MEMBER
PERFORMED AT PERIODIC MONITORING
S26 ALERT PROJECT MEMBER NOT PRESSING BUTTON REGARDING CONCERN (AUTOMATICALLY TRANSMIT ALERT MAIL)
S25 HAVE ALL MEMBERS PRESSED BUTTON?
NO
YES
S27 IS AGREE BUTTON PRESSED FOR NUMBER OF TIMES GREATER THAN OR EQUAL TO THRESHOLD IN TOTAL?
NO
YES
S28 CREATE RISK MANAGEMENT TABLE (AUTOMATIC TRANSCRIPTION)
S29 DETERMINE CONCERN IS NOT RISK
END lation unit in accordance with the level of goal achievement calculated by the achievement level calculation unit and performs control to display the calculation result on a display in the display mode being set.

12 Claims, 9 Drawing Sheets

(58) Field of Classification Search
USPC .......................................................... 705/7.28
See application file for complete search history.

(56) References Cited

U.S. PATENT DOCUMENTS

| | | | | |
|---|---|---|---|---|
| 7,908,660 | B2 * | 3/2011 | Bahl | G06F 21/577 726/25 |
| 7,930,681 | B2 * | 4/2011 | Kloeffer | G06Q 10/06 717/120 |
| 8,290,796 | B1 * | 10/2012 | Kruckeberg | 705/4 |
| 8,712,827 | B2 * | 4/2014 | Mollicone | G06Q 10/0639 705/7.38 |
| 2003/0093310 | A1 * | 5/2003 | Macrae | G06Q 10/0637 705/7.36 |
| 2006/0095915 | A1 | 5/2006 | Clater | |
| 2006/0173762 | A1 | 8/2006 | Clater | |
| 2008/0114700 | A1 * | 5/2008 | Moore | G06Q 40/06 705/36 R |
| 2009/0006381 | A1 | 1/2009 | Aoyama et al. | |
| 2009/0265199 | A1 * | 10/2009 | Moerdler | G06Q 10/06311 705/7.39 |
| 2009/0265200 | A1 * | 10/2009 | Boswell | G06Q 10/06393 705/7.39 |
| 2009/0265209 | A1 * | 10/2009 | Swaminathan | G06Q 10/0637 705/7.13 |
| 2012/0066018 | A1 | 3/2012 | Piersol | |
| 2014/0164290 | A1 * | 6/2014 | Salter | G06Q 40/06 705/36 R |

FOREIGN PATENT DOCUMENTS

| | | | |
|---|---|---|---|
| JP | 2008-527500 | A | 7/2008 |
| JP | 2009-009341 | A | 1/2009 |
| JP | 2009-064114 | A | 3/2009 |
| JP | 2009-134460 | A | 6/2009 |
| JP | 2010-118012 | A | 5/2010 |
| JP | 2012-113537 | A | 6/2012 |
| JP | 2013-228923 | A | 11/2013 |
| JP | 2013-543604 | A | 12/2013 |
| JP | 2014-235654 | A | 12/2014 |
| JP | 2015-153010 | A | 8/2015 |

OTHER PUBLICATIONS

Building Sustainable Sarbanes-Oxley Management Processes, Niku 2005 Global Conference (Year: 2005).*

International Search Report (PCT/ISA/210) dated May 16, 2017, by the Japanese Patent Office as the International Searching Authority for International Application No. PCT/JP2017/009030.

Written Opinion (PCT/ISA/237) dated May 16, 2017, by the Japanese Patent Office as the International Searching Authority for International Application No. PCT/JP2017/009030.

* cited by examiner

100
PROJECT MANAGEMENT SUPPORT SYSTEM
101
PROCESSOR
111
RATIO CALCULATION UNIT
112
ACHIEVEMENT LEVEL CALCULATION UNIT
113
DISPLAY CONTROL UNIT
114
SELECTION OPERATION UNIT
115
MEASURE RECORDING UNIT
116
RATE-OF-CHANGE CALCULATION UNIT
102
MEMORY
121
PROBLEM MANAGEMENT TABLE
122
RISK MEASURE TO-DO LIST
123
TARGET VALUE
124
RISK MANAGEMENT TABLE
125
TIME SERIES DATA
104
DISPLAY
103
INPUT DEVICE

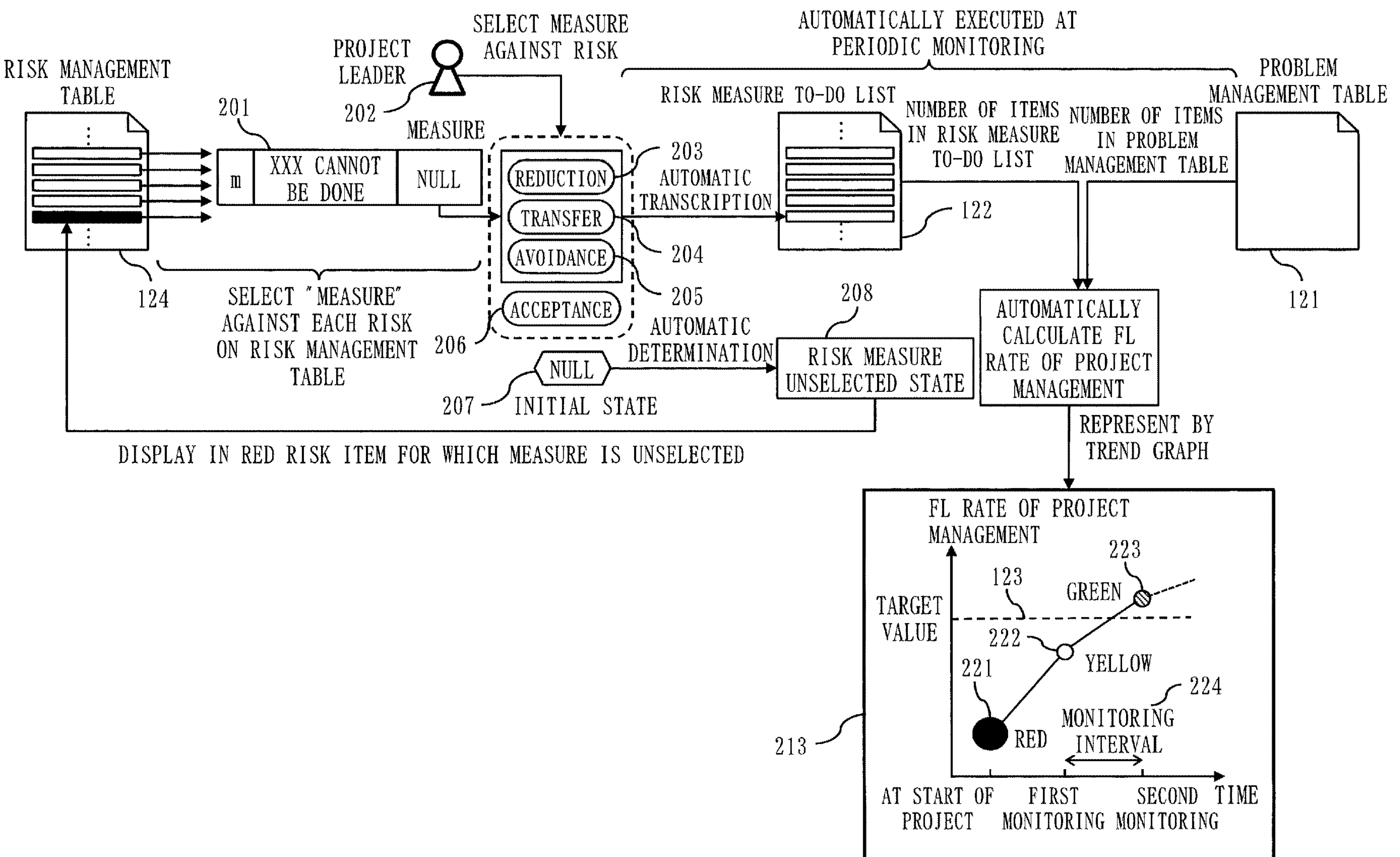

Fig. 2
RISK MANAGEMENT TABLE
124
201
m
XXX CANNOT BE DONE
NULL
MEASURE
PROJECT LEADER
202
SELECT MEASURE AGAINST RISK
SELECT "MEASURE" AGAINST EACH RISK ON RISK MANAGEMENT TABLE
REDUCTION
TRANSFER
AVOIDANCE
ACCEPTANCE
203
204
205
206
NULL
207
INITIAL STATE
AUTOMATIC TRANSCRIPTION
AUTOMATIC DETERMINATION
AUTOMATICALLY EXECUTED AT PERIODIC MONITORING
RISK MEASURE TO-DO LIST
122
RISK MEASURE UNSELECTED STATE
208
DISPLAY IN RED RISK ITEM FOR WHICH MEASURE IS UNSELECTED
PROBLEM MANAGEMENT TABLE
121
NUMBER OF ITEMS IN RISK MEASURE TO-DO LIST
NUMBER OF ITEMS IN PROBLEM MANAGEMENT TABLE
AUTOMATICALLY CALCULATE FL RATE OF PROJECT MANAGEMENT
REPRESENT BY TREND GRAPH
FL RATE OF PROJECT MANAGEMENT
TARGET VALUE
123
221
222
223
224
RED
YELLOW
GREEN
MONITORING INTERVAL
AT START OF PROJECT
FIRST MONITORING
SECOND MONITORING
TIME
213

100
PROJECT MANAGEMENT SUPPORT SYSTEM
109
PROCESSING CIRCUIT
111
RATIO CALCULATION UNIT
112
ACHIEVEMENT LEVEL CALCULATION UNIT
113
DISPLAY CONTROL UNIT
114
SELECTION OPERATION UNIT
115
MEASURE RECORDING UNIT
116
RATE-OF-CHANGE CALCULATION UNIT
121
PROBLEM MANAGEMENT TABLE
122
RISK MEASURE TO-DO LIST
123
TARGET VALUE
124
RISK MANAGEMENT TABLE
125
TIME SERIES DATA
104
DISPLAY
103
INPUT DEVICE

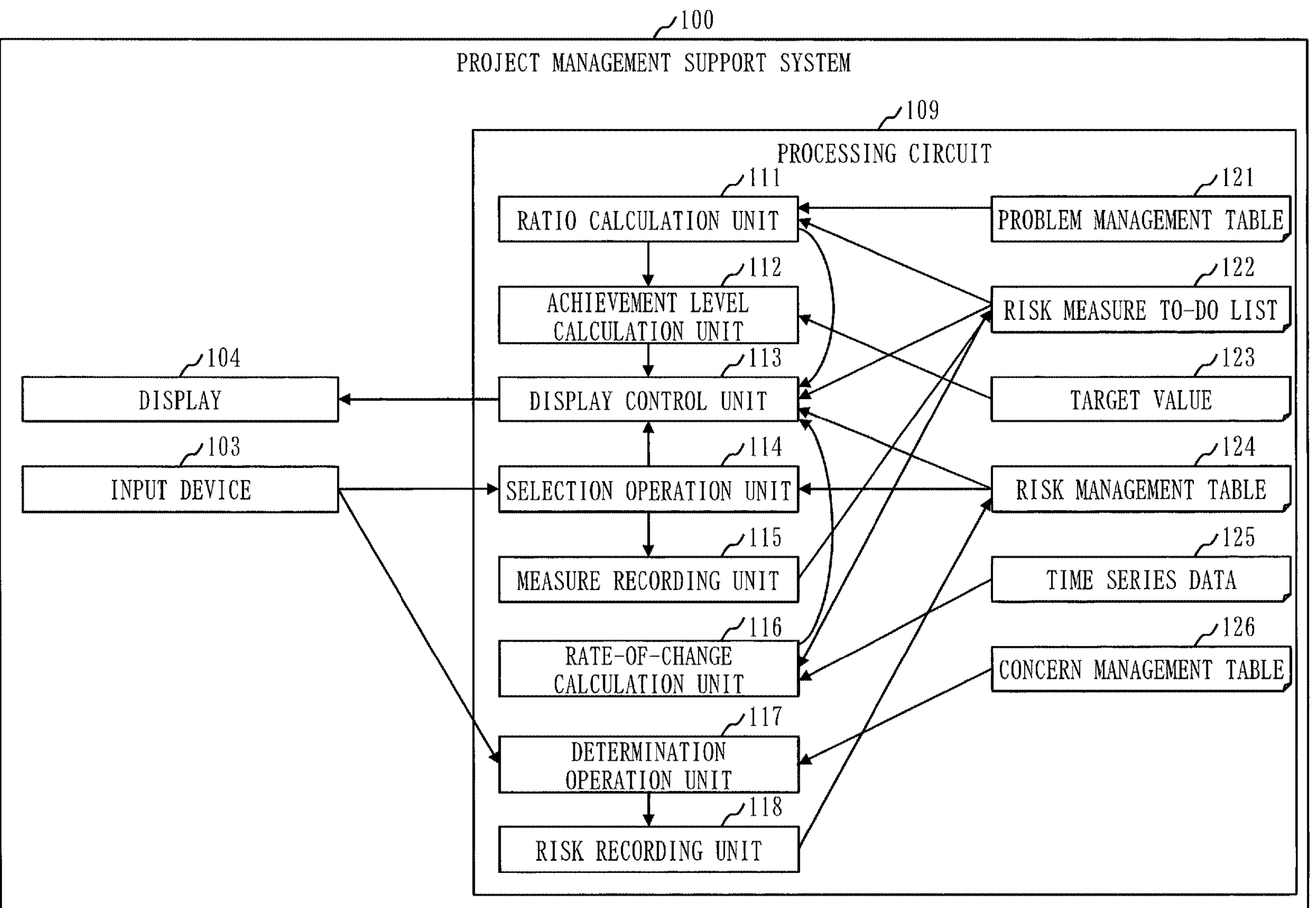
Fig. 9
100
PROJECT MANAGEMENT SUPPORT SYSTEM
109
PROCESSING CIRCUIT
111
RATIO CALCULATION UNIT
112
ACHIEVEMENT LEVEL CALCULATION UNIT
113
DISPLAY CONTROL UNIT
114
SELECTION OPERATION UNIT
115
MEASURE RECORDING UNIT
116
RATE-OF-CHANGE CALCULATION UNIT
117
DETERMINATION OPERATION UNIT
118
RISK RECORDING UNIT
121
PROBLEM MANAGEMENT TABLE
122
RISK MEASURE TO-DO LIST
123
TARGET VALUE
124
RISK MANAGEMENT TABLE
125
TIME SERIES DATA
126
CONCERN MANAGEMENT TABLE
104
DISPLAY
103
INPUT DEVICE

PROJECT MANAGEMENT SUPPORT SYSTEM, PROJECT MANAGEMENT SUPPORT METHOD, AND NON-TRANSITORY COMPUTER READABLE MEDIUM STORING A PROJECT MANAGEMENT SUPPORT PROGRAM

TECHNICAL FIELD

The present invention relates to a project management support system, a project management support method, and a project management support program.

BACKGROUND ART

Patent Literature 1 describes a technique of quantifying a risk of failing a project in progress as a risk score on the basis of information on a past project, and representing a time series variation in the risk score by a graph.

CITATION LIST

Patent Literature

Patent Literature 1: JP 2014-235654 A

SUMMARY OF INVENTION

Technical Problem

Risk management in project management can be implemented by extracting risks by referring to problems in a past similar project and creating a risk management table at the launch of the project. However, even with the risks being extracted and managed at the launch of the project, one cannot take enough measures to reduce the risks and allows almost all the risks to be accepted if advantages of risk management are not understood, whereby the risks are managed as problems after becoming manifest as problems. Moreover, merely extracting risk candidates from the past similar project at the time of extracting the risks causes concerns and anxieties of all project members to be buried and not recognized as risks.

An object of the present invention is to promote risk reduction in a project.

Solution to Problem

A project management support system according to one aspect of the present invention includes:

a ratio calculation unit to access a memory that stores a problem management table which records a problem arising in a project and a measure management table which records a measure against a risk being a factor for occurrence of a problem in the project, and calculate as a front loading rate a ratio of the number of measures recorded in the measure management table to a sum of the number of problems recorded in the problem management table and the number of measures recorded in the measure management table;

an achievement level calculation unit to calculate a level of goal achievement for the front loading rate from a calculation result by the ratio calculation unit and a target value of the front loading rate; and a display control unit to set a display mode of the calculation result by the ratio calculation unit in accordance with the level of goal achievement calculated by the achievement level calculation unit, and perform control to display the calculation result on a display in the display mode being set.

Advantageous Effects of Invention

The present invention records the problem in the project in the problem management table and records the measure for reducing a risk in the project in the measure management table. Then, the ratio of the number of measures recorded in the measure management table to the sum of the number of problems recorded in the problem management table and the number of measures recorded in the measure management table is calculated as the front loading rate, and the display mode of the calculation result of the front loading rate is set in accordance with the level of goal achievement of the front loading rate. The calculation result of the front loading rate is displayed in such a display mode being set to enable visual recognition of the level of risk reduction in the project and be able to promote risk reduction.

BRIEF DESCRIPTION OF DRAWINGS

FIG. 2 is a conceptual diagram for explaining a risk management method based on a risk measure to-do list and an "FL rate of project management" according to the first embodiment.

FIG. 9 is a block diagram illustrating the configuration of a project management support system according to a variation of the second embodiment.

DESCRIPTION OF EMBODIMENTS

Figure 1:
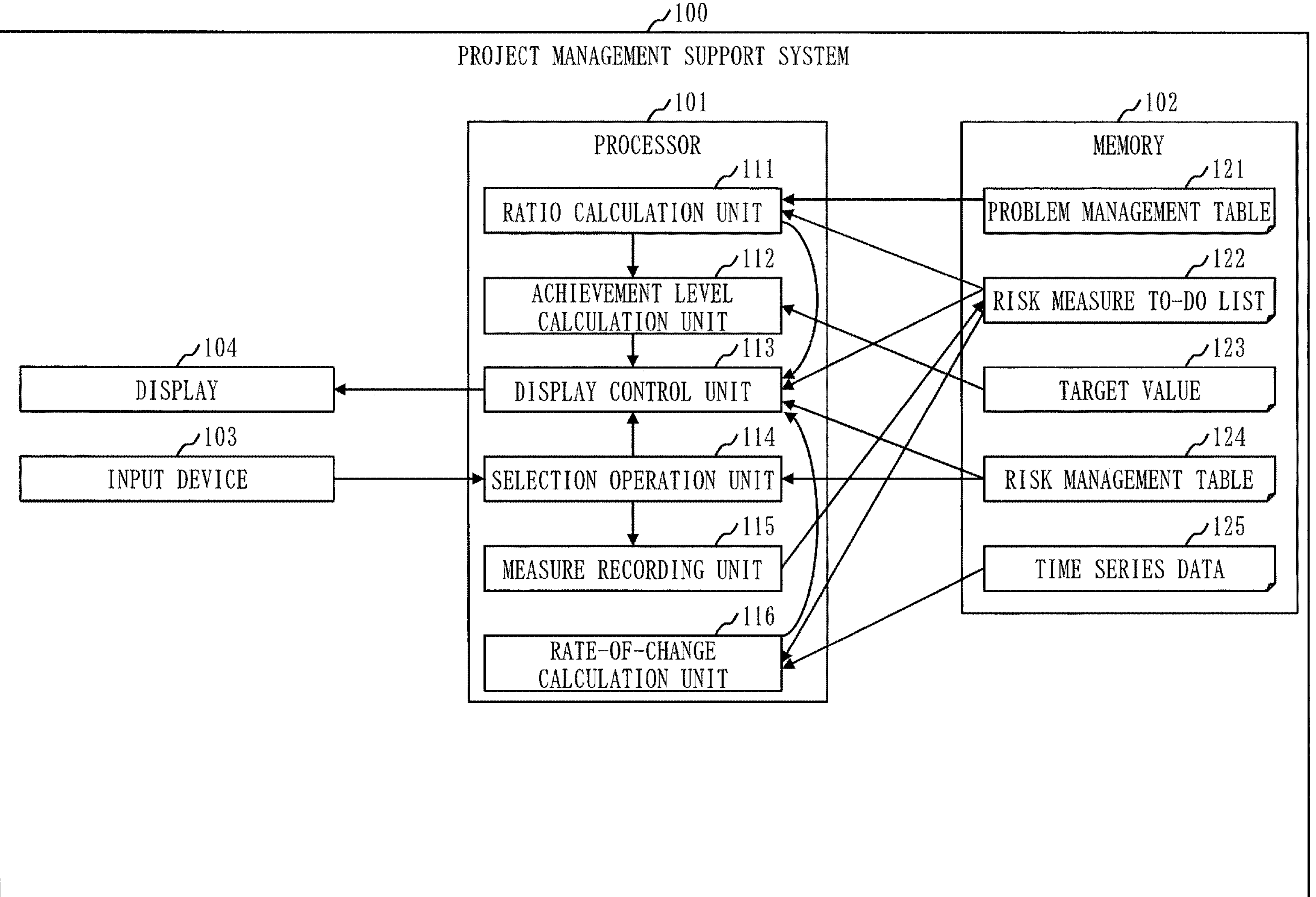
FIG. 1 is a block diagram illustrating the configuration of a project management support system according to a first embodiment.

Embodiments of the present invention will now be described with reference to the drawings. Note that parts that are identical or equivalent to each other in the drawings are denoted by the same reference numerals. Descriptions of the parts that are identical or equivalent to each other will be omitted or simplified as appropriate in the description of the embodiments.

First Embodiment

* Description of Configuration *

The configuration of a project management support system 100 according to the present embodiment will be described with reference to FIG. 1.

The project management support system 100 is a computer. The project management support system 100 includes hardware such as a processor 101, a memory 102, an input device 103, and a display 104. The processor 101 is connected to other hardware via a signal line to control the other hardware.

The project management support system 100 includes, as functional elements, a ratio calculation unit 111, an achievement level calculation unit 112, a display control unit 113, a selection operation unit 114, a measure recording unit 115, and a rate-of-change calculation unit 116. The functions of "units" such as the ratio calculation unit 111, the achievement level calculation unit 112, the display control unit 113, the selection operation unit 114, the measure recording unit 115, and the rate-of-change calculation unit 116 are implemented in software.

The processor 101 is an integrated circuit (IC) that performs processing. The processor 101 is specifically a central processing unit (CPU).

The memory 102 stores a problem management table 121, a risk measure to-do list 122 corresponding to a measure management table, a target value 123 of a "front loading (FL) rate of project management" corresponding to a front loading rate, a risk management table 124, and time series data 125 of a risk score corresponding to an index. The memory 102 is specifically a flash memory or a random access memory (RAM).

The input device 103 is specifically a mouse, a keyboard, or a touch panel.

The display 104 is specifically a liquid crystal display (LCD).

The project management support system 100 may include a communication device as hardware.

The communication device includes a receiver for receiving data and a transmitter for transmitting data. The communication device is specifically a communication chip or a network interface card (NIC).

The memory 102 stores a program for implementing the functions of the "units". The program is loaded into the processor 101 to be executed by the processor 101. The memory 102 also stores an operating system (OS). The processor 101 executes the program that implements the functions of the "units" while running the OS.

Note that the program implementing the functions of the "units" and the OS may be stored in an auxiliary storage. The auxiliary storage is specifically a flash memory or a hard disk drive (HDD). The program and the OS stored in the auxiliary storage are loaded into the memory 102 to be executed by the processor 101.

The project management support system 100 may include only one processor 101 or a plurality of the processors 101. The plurality of the processors 101 may execute the program implementing the functions of the "units" in cooperation with one another.

The project management support system 100 may be a single computer or a combination of a plurality of computers operating in cooperation by communicating with one another. The functions of different "units" may be distributed among the plurality of computers to be implemented, or the function of a single "unit" may be implemented redundantly by the plurality of computers.

Information, data, a signal value, and a variable value representing a result of processing by the "unit" are stored in the memory 102, the auxiliary storage, or a register or cache memory in the processor 101.

The program implementing the functions of the "units" may be stored in a portable recording medium such as a magnetic disk or an optical disk.

* Description of Operation *

The operation of the project management support system 100 according to the present embodiment will be described with reference to FIGS. 1, 2, 3, and 4. The operation of the project management support system 100 corresponds to a project management support method according to the present embodiment. The operation of the project management support system 100 corresponds to a procedure in a project management support program according to the present embodiment.

The project management support system 100 performs the following operations to clarify a specific action for implementing risk reduction by the risk measure to-do list 122 and perform risk management by periodically monitoring the "FL rate of project management" indicating the level of risk reduction that can be newly defined and calculated.

Figure 4:
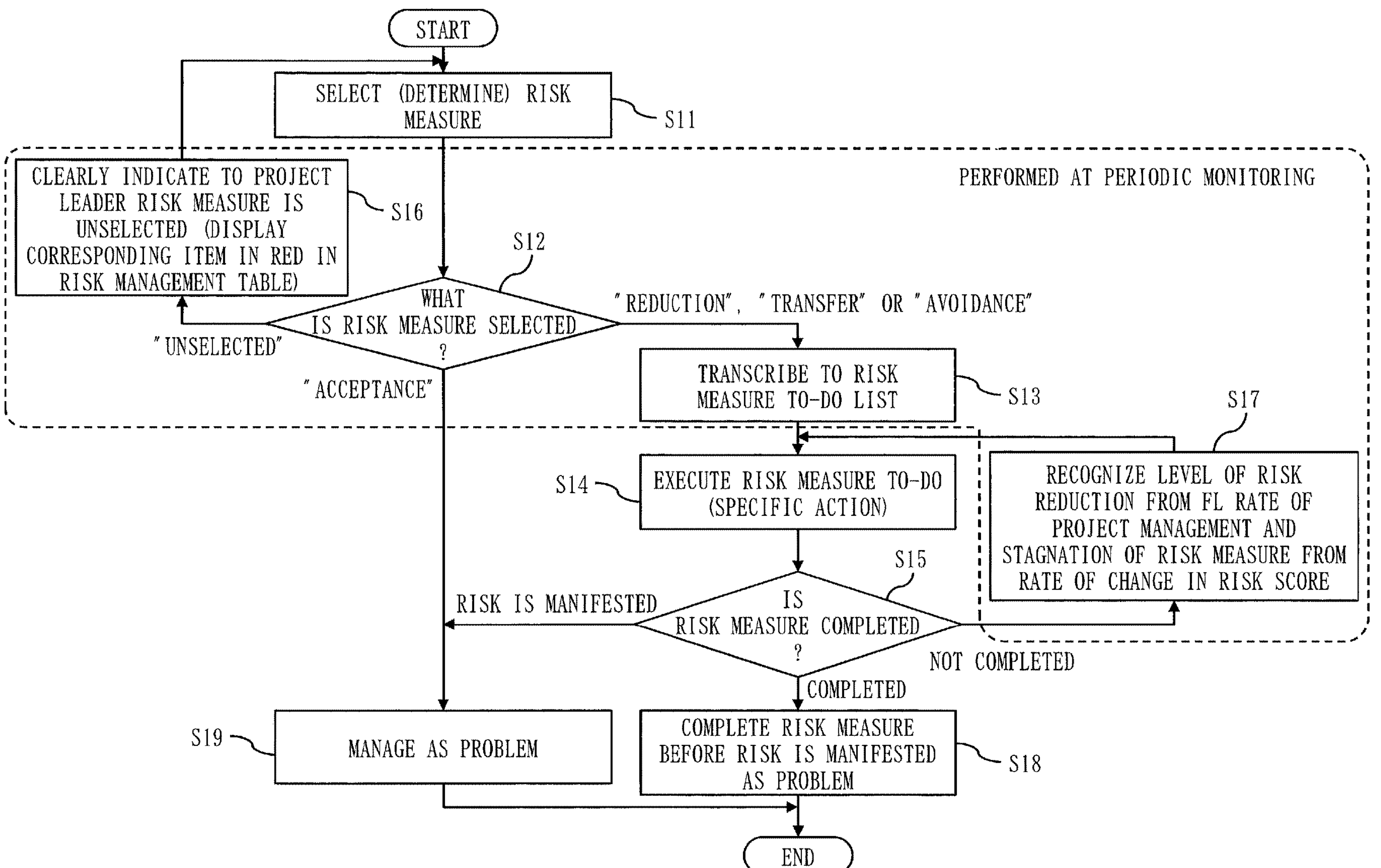
FIG. 4 is a flowchart illustrating the operation of the project management support system according to the first embodiment.

In step S11 of FIG. 4, the selection operation unit 114 accesses the memory 102 and accepts an operation that selects whether to implement a measure against a risk or accept a risk for each risk recorded in the risk management table 124. The risk management table 124 is data recording the risk that can cause a problem in a project. In the present embodiment, as illustrated in FIG. 2, a project leader 202 selects a measure against a risk item 201 managed in the risk management table 124 through any one of a reduction button 203, a transfer button 204, and an avoidance button 205. Alternatively, an acceptance button 206 is selected when the risk is to be accepted. The reduction button 203 is a button for selecting reduction as a measure against the risk. The transfer button 204 is a button for selecting transfer as a measure against the risk. The avoidance button 205 is a button for selecting avoidance as a measure against the risk. The acceptance button 206 is a button for selecting risk acceptance. These buttons are displayed on the display 104.

In step S12 of FIG. 4, the measure recording unit 115 automatically recognizes that the measure against the risk is selected through the reduction button 203, the transfer button 204, or the avoidance button 205 for a risk item having high priority at the periodic risk monitoring, and then proceeds to step S13.

When the operation selecting implementation of a measure against a risk is performed on the selection operation unit 114, the measure recording unit 115 in step S13 of FIG. 4 accesses the memory 102 and adds the measure to the risk measure to-do list 122. The risk measure to-do list 122 is data recording a measure against a risk that can cause a problem in a project. In the present embodiment, as illustrated in FIG. 2, the measure recording unit 115 clarifies a specific action to implement a measure against the risk by assigning a unique identifier (ID) or number to the risk item automatically recognized in step S12 and automatically transcribing it to the risk measure to-do list 122.

When the measure against the risk is implemented, in step S14 of FIG. 4, the measure recording unit 115 records information indicating that the measure is implemented in the risk measure to-do list 122. In the present embodiment, as illustrated in FIG. 2, the measure against the risk such as "reduction", "transfer", or "avoidance" is implemented by executing the specific action implementing the measure against the risk that is clarified in step S13.

In step S15 of FIG. 4, the process proceeds to step S17 if the measure against the risk is not completed, proceeds to step S18 if the measure against the risk is completed, or proceeds to step S19 if the risk is manifested.

In step S12 of FIG. 4, the display control unit 113 determines that the system is in a risk measure unselected state 208 if the measure against the risk is not selected through the reduction button 203, the transfer button 204, or the avoidance button 205 for the risk item having high priority at the periodic risk monitoring or in the case of a null state 207 in which the risk is not accepted through the acceptance button 206. The process then proceeds to step S16.

In step S16 of FIG. 4, the display control unit 113 sets a display mode of display data representing the risk recorded in the risk management table 124 depending on whether the operation is performed on the selection operation unit 114, and performs control to display the display data on the display 104 in the display mode being set. A specific example of the "control to display" the display data includes directly outputting the display data on a screen of the display 104 in a computer on which the function of the display control unit 113 is implemented, transmitting the display data to a user terminal via a network and outputting the display data on a screen of the display 104 on the user terminal, and the like. In the present embodiment, as illustrated in FIG. 2, the display control unit 113 displays a corresponding item on the risk management table 124 in red to clearly indicate to the project leader 202 that a measure against the risk is not selected. The process then returns to step S11.

The risk management table 124 is linked with the risk measure to-do list 122 so that opening the risk management table 124 opens the risk measure to-do list 122 and that a change in the content on the risk management table 124 causes the content of a corresponding item on the risk measure to-do list 122 to be updated automatically.

In step S17 of FIG. 4, the ratio calculation unit 111 accesses the memory 102 to calculate, as the "FL rate of project management", a ratio of the number of measures recorded in the risk measure to-do list 122 to the sum of the number of problems recorded in the problem management table 121 and the number of measures recorded in the risk measure to-do list 122. The problem management table 121 is data recording problems that arise in a project. The achievement level calculation unit 112 calculates a level of goal achievement of the "FL rate of project management" from a calculation result by the ratio calculation unit 111 and a target value 123 of the "FL rate of project management". The display control unit 113 sets a display mode of the calculation result by the ratio calculation unit 111 in accordance with the level of goal achievement calculated by the achievement level calculation unit 112 and performs control to display the calculation result on the display 104 in the display mode being set.

In the present embodiment, the ratio calculation unit 111 accesses the memory 102 repeatedly after the start of a project and calculates the "FL rate of project management", thereby generating time series data of the "FL rate of project management". The achievement level calculation unit 112 calculates the level of goal achievement of the "FL rate of project management" for each calculation result obtained by the ratio calculation unit 111 and included in the time series data generated by the ratio calculation unit 111. The display control unit 113 sets a display mode of the calculation result obtained by the ratio calculation unit 111 and included in the time series data generated by the ratio calculation unit 111 in accordance with the level of goal achievement calculated by the achievement level calculation unit 112, and performs control to display, on the display 104, a graph on which the calculation result is plotted in the display mode being set.

As described above, the present embodiment newly defines the "FL rate of project management" expressed by the following expression in order to promote prior management of problems in project management, or management of the problems as risks.

"FL rate of project management"=the number of items of measures by reduction, transfer, and avoidance on the risk measure to-do list/(the number of items of measures by reduction, transfer, and avoidance on the risk measure to-do list+the number of items on the problem management table)

In the present embodiment, as illustrated in FIG. 2, the ratio calculation unit 111 automatically calculates the "FL rate of project management" from the number of items in the risk measure to-do list 122 and the number of items in the problem management table 121 at the time of the periodic risk monitoring. The display control unit 113 displays the calculated value together with the target value 123 as a trend graph 213. Specifically, in order to clearly indicate the level of progress of risk reduction toward the target on the trend graph 213, the display control unit 113 displays a dot in a large size and in red 221 when the dot falls below the target value 123. The display control unit 113 displays a dot in yellow 222 when the dot approaches the target value 123. The display control unit 113 displays a dot in green 223 when the dot exceeds the target value 123.

In the present embodiment, the target value 123 of the "FL rate of project management" has a default value, which can be freely changed project by project. A risk monitoring interval 224 also has a default value, which can be freely changed project by project.

Moreover, in step S17 of FIG. 4, the rate-of-change calculation unit 116 accesses the memory 102 and calculates a rate of change of a risk score from the time series data 125 thereof for each measure recorded in the risk measure to-do list 122. The risk score is an index representing a result of the measure recorded in the risk measure to-do list 122. The display control unit 113 sets a display mode of display data representing the measure recorded in the risk measure to-do list 122 in accordance with the rate of change calculated by the rate-of-change calculation unit 116, and performs control to display the display data on the display 104 in the display mode being set. The process then returns to step S14.

As described above, the present embodiment newly defines the "rate of change in risk score" expressed by the following expression in order to automatically determine stagnation of measures against the risks.

Figure 3:
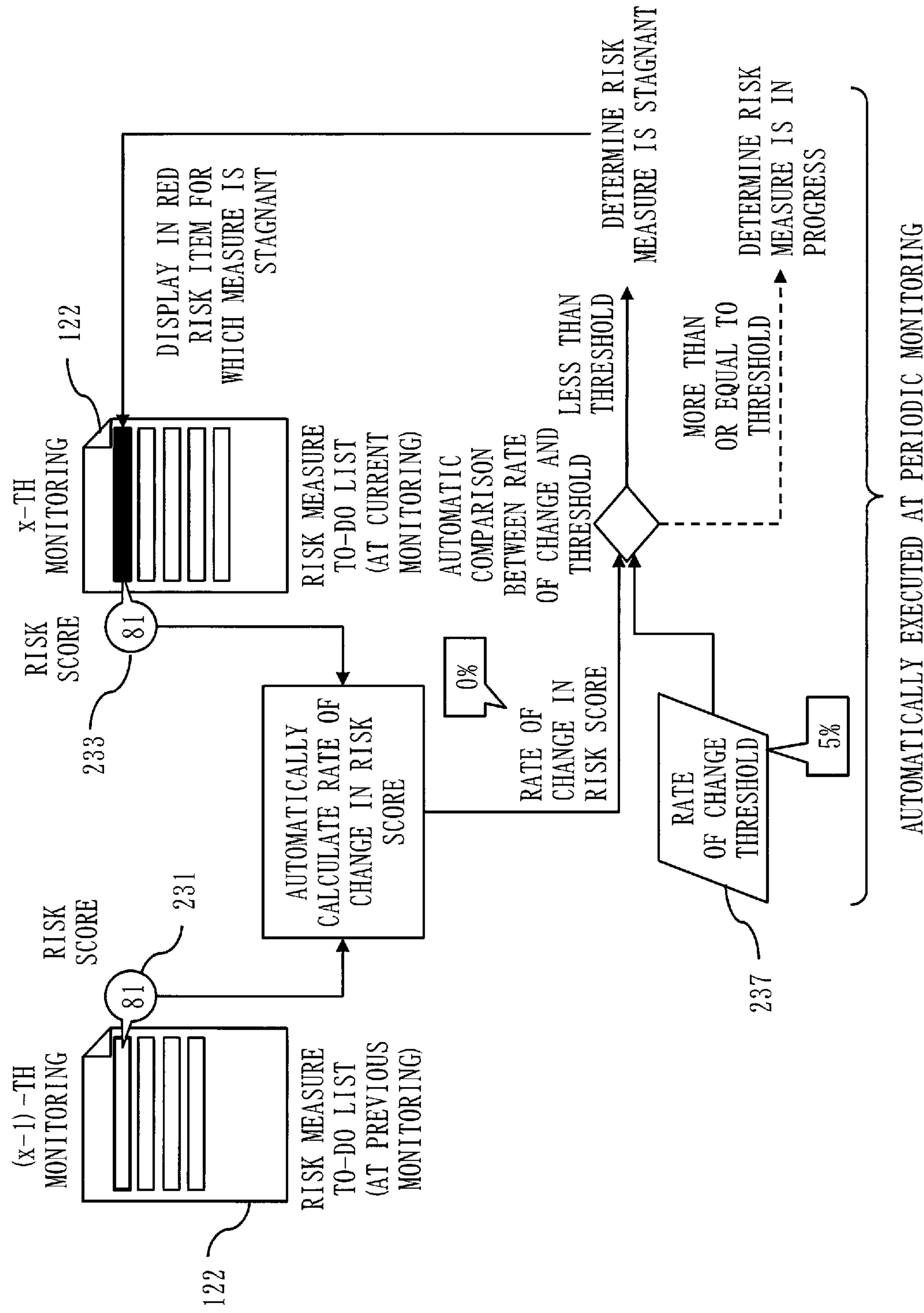
FIG. 3 is a conceptual diagram for explaining a method in which stagnation of risk measures can be determined and recognized automatically by a "rate of change in risk score" according to the first embodiment.

"rate of change in risk score"=(previous risk score−current risk score)/previous risk score In the present embodiment, as illustrated in FIG. 3, the rate-of-change calculation unit 116 automatically calculates the "rate of change in risk score" at the time of the periodic risk monitoring by using a risk score 231 on the risk measure to-do list 122 at previous monitoring and a risk score 233 on the risk measure to-do list 122 at current risk monitoring. The display control unit 113 automatically compares the calculated value with a threshold 237 of the "rate of change in risk score" to automatically determine the stagnation of a specific action and provide notification of the determination result in a format that can be visually recognized. As a specific example, it is assumed that the "rate of change in risk score" automatically calculated from the risk score 231 on the risk measure to-do list 122 at the previous monitoring and the risk score 233 on the risk measure to-do list 122 at the current monitoring equals 0% with the threshold 237 of the "rate of change in risk score" set to 5%. In this case, the automatic comparison between the values results in "less than the threshold", whereby the display control unit 113 determines the system is in "stagnation of measure against the risk" and automatically displays in red a corresponding item on the risk measure to-do list 122 at the current monitoring.

In the present embodiment, the threshold 237 of the "rate of change in risk score" has a default value, which can be freely changed project by project.

In step S18 of FIG. 4, the process is ended since the measure against the risk is completed, meaning that the measure is implemented against the risk before the risk becomes manifest as a problem.

In step S12 of FIG. 4, the measure recording unit 115 automatically recognizes a selection via the acceptance button 206 that a measure against the risk is not implemented for the risk item having high priority at the periodic risk monitoring, and then proceeds to step S19.

When an operation selecting no implementation of a measure against the risk is performed on the selection operation unit 114, the measure recording unit 115 in step S19 of FIG. 4 accesses the memory 102 and adds the risk as a problem to the problem management table 121. The risk manifested in step S15 is also managed as a problem. The process is then ended.

* Description of Effect of Embodiment *

The present embodiment records the problems of the project in the problem management table 121, and records the measures for reducing risks in the project in the risk measure to-do list 122. Then, the ratio of the number of measures recorded in the risk measure to-do list 122 to the sum of the number of problems recorded in the problem management table 121 and the number of measures recorded in the risk measure to-do list 122 is calculated as the "FL rate of project management", whereby the display mode of the calculation result of the "FL rate of project management" is set in accordance with the level of goal achievement of the "FL rate of project management". The calculation result of the "FL rate of project management" is displayed in such a display mode being set to enable visual recognition of the level of risk reduction in the project and be able to promote risk reduction.

The present embodiment automatically recognizes a selection of the measure being "reduction", "transfer", or "avoidance" against the risk item having high priority at the periodic risk monitoring, and assigns a unique ID or number to the item to make clear the risk measure to-do item in a list format. An item on the risk management table 124 is displayed in red when the measure against the risk is not selected and the risk is not accepted. Opening the risk management table 124 also opens the risk measure to-do list 122, and a change in the content on the risk management table 124 also causes the corresponding content on the risk measure to-do list 122 to be updated automatically. When the "rate of change in risk score" automatically calculated from the risk measure to-do list 122 does not exceed the threshold, the incomplete action is displayed in red.

The present embodiment calculates the "FL rate of project management" from the number of items in each of the risk measure to-do list 122 and the problem management table 121 and displays the calculated value as the trend graph together with the target value 123, thereby enabling visual recognition of the level of risk reduction.

The present embodiment makes clear the to-do item for risk reduction from the risk management table 124 and newly defines, calculates, and visualizes the "FL rate of project management" indicating the level of risk reduction. This can promote prior management of problems in project management and also prevent stagnation of an action plan for implementing a measure against a risk.

* Another Configuration *

The functions of the "units" are implemented in software in the present embodiment but may be implemented in hardware as a variation. The variation will be described mainly focusing on differences from the present embodiment.

Figure 5:
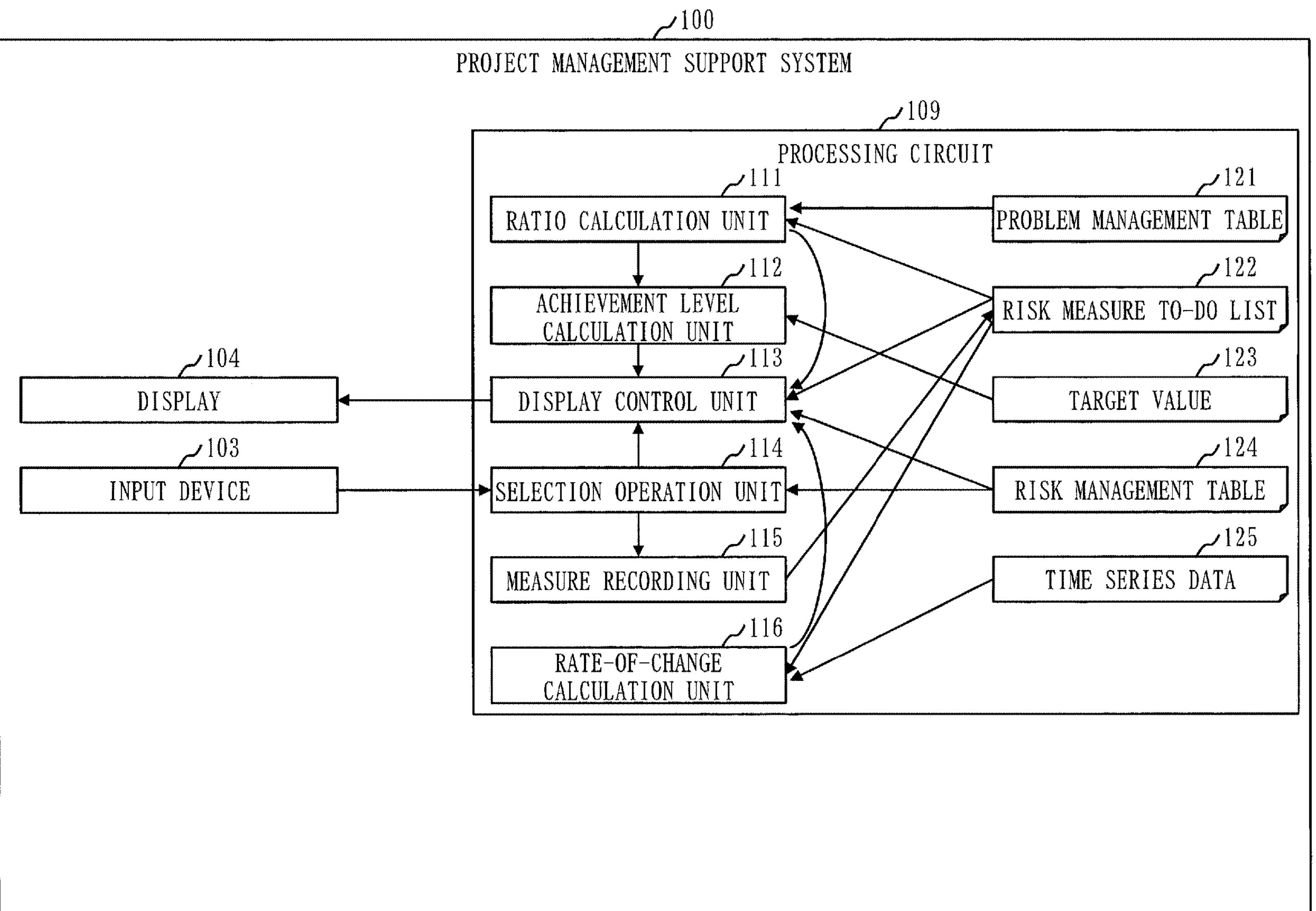
FIG. 5 is a block diagram illustrating the configuration of a project management support system according to a variation of the first embodiment.

The configuration of a project management support system 100 according to the variation of the present embodiment will be described with reference to FIG. 5.

The project management support system 100 includes hardware such as a processing circuit 109, an input device 103, and a display 104.

The processing circuit 109 is a dedicated electronic circuit implementing the functions of the "units". The processing circuit 109 is specifically a single circuit, a composite circuit, a programmed processor, a parallel-programmed processor, a logic IC, a gate array (GA), or a field-programmable gate array (FPGA). Alternatively, the processing circuit 109 is specifically an application specific integrated circuit (ASIC).

The functions of the "units" may be implemented by one processing circuit 109 or may be distributed among a plurality of the processing circuits 109 to be implemented.

As another variation, the functions of the "units" may be implemented by a combination of software and hardware. That is, the function of one or some of the "units" may be implemented in dedicated hardware and the rest of the functions in software.

The processor 101, the memory 102, and the processing circuit 109 are collectively referred to as "processing circuitry". That is, the functions of the "units" are implemented by the processing circuitry regardless of the configuration of the project management support system 100 illustrated in either one of FIGS. 1 and 5.

The "unit" may be replaced with a "step", a "procedure", or "processing".

Second Embodiment

The present embodiment will be described mainly focusing on differences from the first embodiment.

* Description of Configuration *

The configuration of a project management support system 100 according to the present embodiment will be described with reference to FIG. 6.

The project management support system 100 includes, as functional elements similar to that of the first embodiment, a ratio calculation unit 111, an achievement level calculation unit 112, a display control unit 113, a selection operation unit 114, a measure recording unit 115, and a rate-of-change calculation unit 116. In the present embodiment, the project management support system 100 further includes a determination operation unit 117 and a risk recording unit 118 as functional elements. The functions of "units" such as the ratio calculation unit 111, the achievement level calculation unit 112, the display control unit 113, the selection operation unit 114, the measure recording unit 115, the rate-of-change calculation unit 116, the determination operation unit 117, and the risk recording unit 118 are implemented in software.

As with the first embodiment, a memory 102 stores a problem management table 121, a risk measure to-do list 122, a target value 123 of an "FL rate of project management", a risk management table 124, and time series data 125 of a risk score. The memory 102 of the present embodiment further stores a concern management table 126.

* Description of Operation *

The operation of the project management support system 100 according to the present embodiment will be described with reference to FIGS. 6, 7, and 8. The operation of the project management support system 100 corresponds to a project management support method according to the present embodiment. The operation of the project management support system 100 corresponds to a procedure in a project management support program according to the present embodiment.

The project management support system 100 performs the following operations to allow concerns and anxieties to be extracted and recognized as risks.

Figure 8:
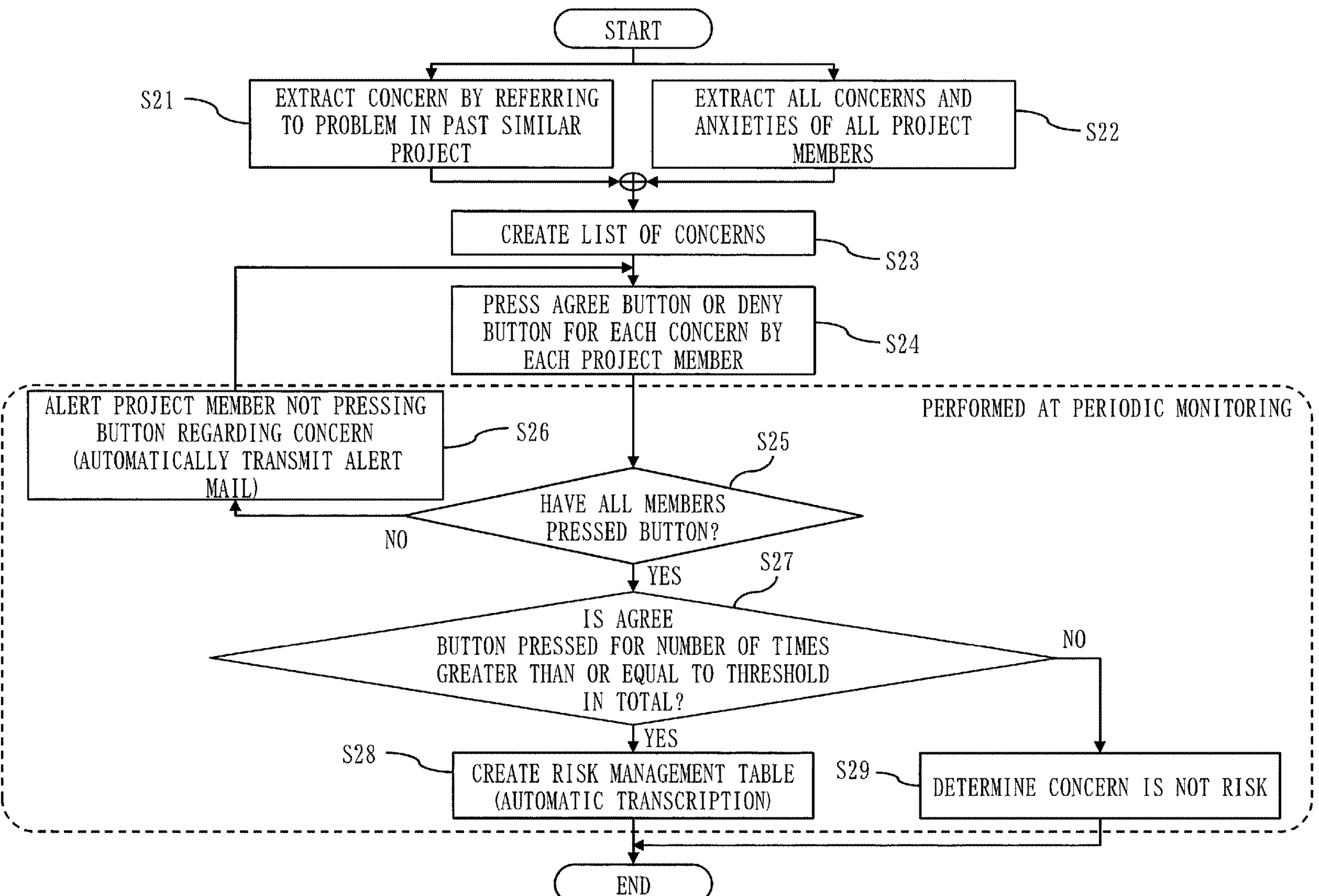
FIG. 8 is a flowchart illustrating the operation of the project management support system according to the second embodiment.

In step S21 of FIG. 8, the measure recording unit 115 extracts a concern by referring to a problem in a past similar project, as in the prior art described in JP 2009-9341 A.

In step S22 of FIG. 8, the measure recording unit 115 receives an input of a result of extraction of a concern 301, an anxiety 302, and the like about a project that an individual project member 300 has.

In step S23 of FIG. 8, the measure recording unit 115 creates the concern management table 126 for managing the concerns extracted in steps S21 and S22. The concern management table 126 is data which records the concerns of the members engaged in the project. The measure recording unit 115 stores the concern management table 126 being created into the memory 102. This allows all the project members 300 to explicitly keep in mind the concern 301 and the anxiety 302 that are previously only present in the thought of each project member 300 and not recognized in the project.

In step S24 of FIG. 8, the determination operation unit 117 accesses the memory 102 and receives, from each member, an operation that determines whether the concern corresponds to a risk for each concern recorded in the concern management table 126. In the present embodiment, as illustrated in FIG. 7, each project member 300 presses an agree button 305 when agreeing to a concern item 304 managed in the concern management table 126 as a risk, or presses a deny button 306 when disagreeing to the concern item as a risk. The agree button 305 and the deny button 306 are displayed on a display 104. Each project member 300 makes a similar determination on all the concerns managed in the concern management table 126.

The process proceeds to step S26 when there is a project member 309 who is in an undetermined state 307 not pressing the agree button 305 or the deny button 306, or when not all the members are done pressing the button, at the time of periodic monitoring in step S25 of FIG. 8. The process proceeds to step S27 when all the project members 300 press the agree button 305 or the deny button 306, or when all the members are done pressing the button, at the time of periodic monitoring.

In step S26 of FIG. 8, the determination operation unit 117 automatically transmits an alert message 308 to the project member 309 who is in the undetermined state 307.

In step S27 of FIG. 8, the determination operation unit 117 automatically compares the number of agreements 311, which is the number of times the agree button 305 is pressed, with a threshold 310 of the number of agreements recognizing a concern as a risk, thereby automatically recognizing as a risk the concern for which the number of agreements 311 is larger than or equal to the threshold 310. The process then proceeds to step S28. The process proceeds to step S29 if the number of agreements 311 is less than the threshold 310.

Steps S25 and S27 are similarly executed for all the concerns managed in the concern management table 126.

In the present embodiment, the threshold 310 of the number of agreements recognizing a concern as a risk has a default value, which can be freely changed project by project. An interval of monitoring the number of agreements 311 by pressing of the agree button 305 also has a default value, which can be freely changed project by project. That is, the period of transmitting the alert message 308 has a default value, which can be freely changed project by project.

When members, the number of whom is more than or equal to a threshold, performs an operation determining that a single concern corresponds to a risk on the determination operation unit 117, the risk recording unit 118 in step S28 of FIG. 8 accesses the memory 102 and adds the concern as a risk to the risk management table 124. The process is then ended. In the present embodiment, as illustrated in FIG. 7, the risk recording unit 118 assigns a unique ID within the project to the concern that is automatically recognized as a risk in step S27, and automatically transcribes the concern to the risk management table 124.

In step S29 of FIG. 8, nothing is done to a concern not recognized as a risk in step S27, and the process is ended.

* Description of Effect of Embodiment *

The present embodiment creates the concern management table 126 that manages the concern and anxiety each project member 300 has about the project, and automatically recognizes the concern as a risk when the number of times the agree button 305 is pressed is more than or equal to the threshold 310 at the periodic monitoring. Then, the concern recognized as a risk is assigned a unique ID or number to be added to the risk management table 124. This allows the concern 301 and the anxiety 302, which are previously only present in the thought of the project member 300 and not recognized in the project, to be extracted and recognized as risks.

Moreover, the present embodiment automatically transmits the alert message 308 when neither the agree button 305 nor the deny button 306 is pressed for a certain period of time. This can prevent making a determination from being stagnant.

* Another Configuration *

As with the first embodiment, the functions of the "units" are implemented in software in the present embodiment but may be implemented in hardware as a variation, as illustrated in FIG. 9. In the variation, a project management support system 100 includes a processing circuit 109 similar to that in the variation of the first embodiment.

As another variation, the functions of the "units" may be implemented by a combination of software and hardware. That is, the function of one or some of the "units" may be implemented in dedicated hardware and the rest of the functions in software.

Figure 6:
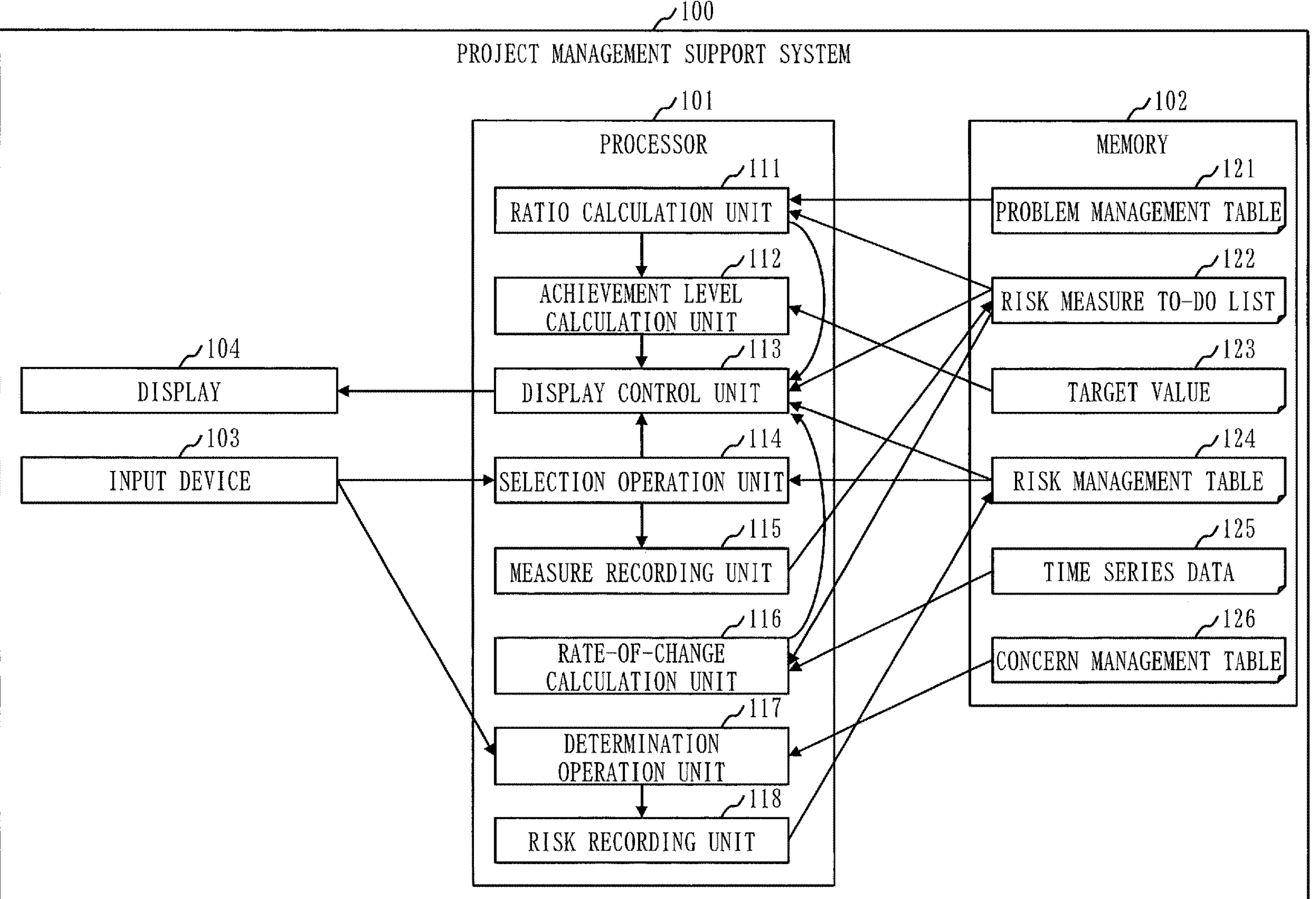
FIG. 6 is a block diagram illustrating the configuration of a project management support system according to a second embodiment.
Figure 7:
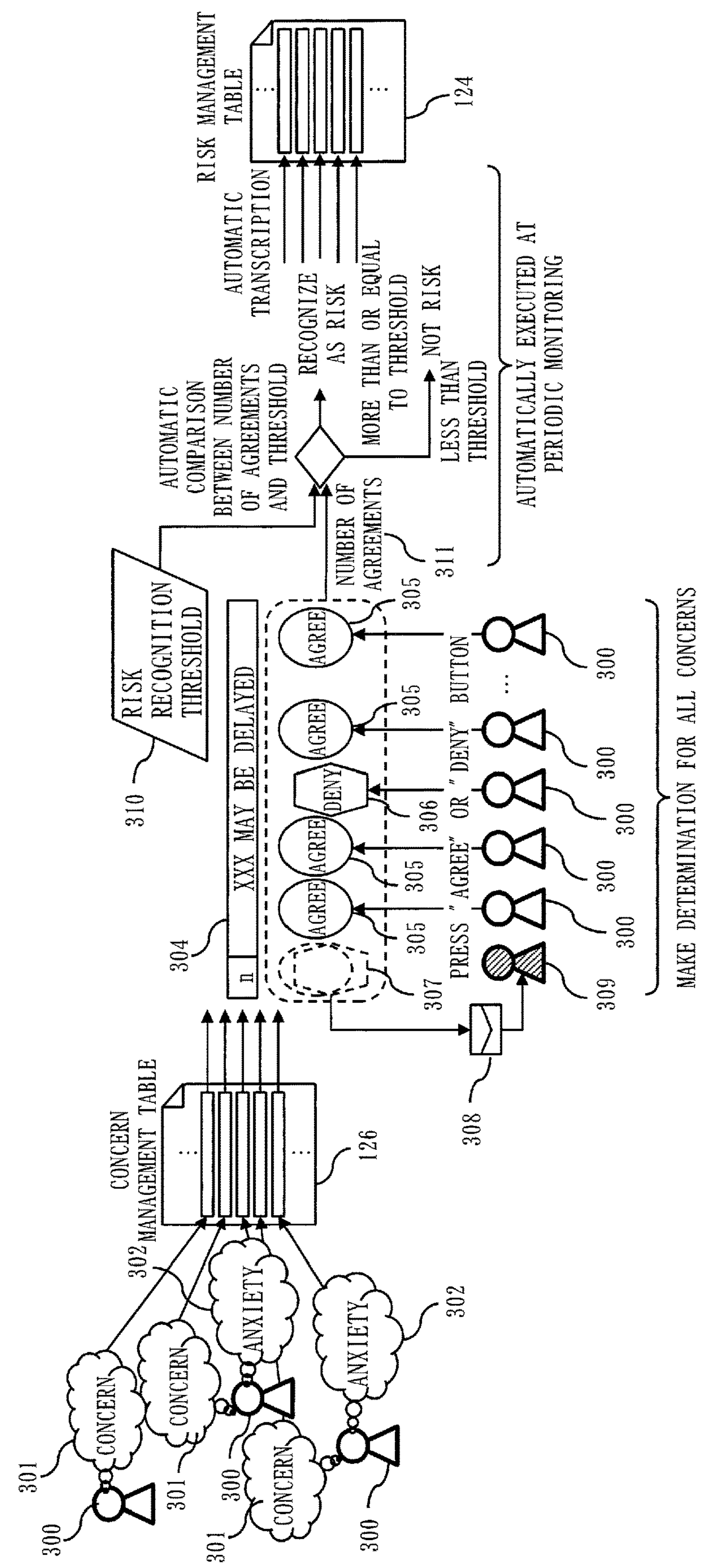
FIG. 7 is a conceptual diagram for explaining a method in which concern and anxiety can be extracted and recognized as risks, according to the second embodiment.

The functions of the "units" are implemented by processing circuitry regardless of the configuration of the project management support system 100 illustrated in either one of FIGS. 6 and 9.

While the embodiments of the present invention have been described, two or more of those embodiments may be combined and implemented. Alternatively, one or a combination of two or more of those embodiments may be partially implemented. Specifically, only some of the functional elements of the project management support system 100 according to those embodiments may be adopted. Note that the present invention is not to be limited by those embodiments but can be modified in various manners as needed.

REFERENCE SIGNS LIST

100: project management support system, 101: processor, 102: memory, 103: input device, 104: display, 109: processing circuit, 111: ratio calculation unit, 112: achievement level calculation unit, 113: display control unit, 114: selection operation unit, 115: measure recording unit, 116: rate-of-change calculation unit, 117: determination operation unit, 118: risk recording unit, 121: problem management table, 122: risk measure to-do list, 123: target value, 124: risk management table, 125: time series data, 126: concern management table, 201: risk item, 202: project leader, 203: reduction button, 204: transfer button, 205: avoidance button, 206: acceptance button, 207: null state, 208: risk measure unselected state, 213: trend graph, 221: display in red, 222: display in yellow, 223: display in green, 224: risk monitoring interval, 231: risk score, 233: risk score, 237: threshold, 300: project member, 301: concern, 302: anxiety, 304: concern item, 305: agree button, 306: deny button, 307: undetermined state, 308: alert message, 309: project member, 310: threshold, 311: number of agreements

The invention claimed is:

1. A project management support system comprising processing circuitry to:

access a memory that stores a problem management table which records a problem arising in a project and a measure management table which records a measure against a risk being a factor for occurrence of a problem in the project, and calculate as a front loading rate a ratio of the number of measures recorded in the measure management table to a sum of the number of problems recorded in the problem management table and the number of measures recorded in the measure management table;

calculate a level of goal achievement for the front loading rate from a calculation result of the front loading rate and a target value of the front loading rate;

set a display mode of the calculation result of the front loading rate in accordance with the level of goal achievement being calculated, and perform control to display the calculation result on a display in the display mode being set; and link a risk management table which records a risk being a factor for the occurrence of a problem in the project with a risk measure-to-do list such that a change to the risk management table in content automatically causes a change to corresponding content on the risk measure-to-do list.

2. The project management support system according to claim 1, wherein the processing circuitry repeatedly accesses the memory after start of the project and calculates the front loading rate to generate time series data of the front loading rate, the processing circuitry calculates a level of goal achievement of the front loading rate for each calculation result of the front loading rate and included in the time series data, and the processing circuitry sets a display mode of the calculation result of the front loading rate and included in the time series data in accordance with the level of goal achievement being calculated, and performs control to display, on the display, a graph on which the calculation result is plotted in the display mode being set.

3. The project management support system according to claim 2, wherein the processing circuitry accesses the memory storing the risk management table, and accepts an operation that selects whether to implement a measure against a risk or accept a risk for each risk recorded in the risk management table, and the processing circuitry accesses the memory and adds a measure against a risk to the measure management table when an operation selecting implementation of the measure is performed.

4. The project management support system according to claim 3, wherein the processing circuitry sets a display mode of display data representing the risk recorded in the risk management table depending on whether an operation selecting implementation of the measure or accepting the risk is performed, and performs control to display the display data on the display in the display mode being set.

5. The project management support system according to claim 3, wherein the processing circuitry accesses the memory that stores time series data of an index representing a result of the measure recorded in the measure management table, and calculates a rate of change of the index for each measure recorded in the measure management table, and the processing circuitry sets a display mode of display data representing the measure recorded in the measure management table in accordance with the rate of change being calculated, and performs control to display the display data on the display in the display mode being set.

6. The project management support system according to claim 2, wherein the processing circuitry accesses the memory that stores the risk management table and a concern management table which records a concern of a member engaged in the project, and accepts from each member an operation determining whether a concern corresponds to a risk for each concern recorded in the concern management table, and the processing circuitry accesses the memory and adds a concern to the risk management table as a risk when members, the number of whom is more than or equal to a threshold, perform an operation determining that a same concern corresponds to a risk.

7. The project management support system according to claim 1, wherein the processing circuitry accesses the memory storing the risk management table, and accepts an operation that selects whether to implement a measure against a risk or accept a risk for each risk recorded in the risk management table, and the processing circuitry accesses the memory and adds a measure against a risk to the measure management table when an operation selecting implementation of the measure is performed.

8. The project management support system according to claim 7, wherein the processing circuitry sets a display mode of display data representing the risk recorded in the risk management table depending on whether an operation selecting implementation of the measure or accepting the risk is performed, and performs control to display the display data on the display in the display mode being set.

9. The project management support system according to claim 7, wherein the processing circuitry accesses the memory that stores time series data of an index representing a result of the measure recorded in the measure management table, and calculates a rate of change of the index for each measure recorded in the measure management table, and the processing circuitry sets a display mode of display data representing the measure recorded in the measure management table in accordance with the rate of change being calculated, and performs control to display the display data on the display in the display mode being set.

10. The project management support system according to claim 1, wherein the processing circuitry accesses the memory that stores the risk management table and a concern management table which records a concern of a member engaged in the project, and accepts from each member an operation determining whether a concern corresponds to a risk for each concern recorded in the concern management table, and the processing circuitry accesses the memory and adds a concern to the risk management table as a risk when members, the number of whom is more than or equal to a threshold, perform an operation determining that a same concern corresponds to a risk.

11. A project management support method comprising:

accessing a memory that stores a problem management table which records a problem arising in a project and a measure management table which records a measure against a risk being a factor for occurrence of a problem in the project, and calculating as a front loading rate a ratio of the number of measures recorded in the measure management table to a sum of the number of problems recorded in the problem management table and the number of measures recorded in the measure management table;

calculating a level of goal achievement for the front loading rate from a calculation result of the front loading rate and a target value of the front loading rate;

setting a display mode of the calculation result of the front loading rate in accordance with the level of goal achievement being calculated, and performing control to display the calculation result on a display in the display mode being set; and linking a risk management table which records a risk being a factor for the occurrence of a problem in the project with a risk measure-to-do list such that a change to the risk management table in content automatically causes a change to corresponding content on the risk measure-to-do list.

12. A non-transitory computer readable medium storing a project management support program that causes a computer to execute:

processing to access a memory that stores a problem management table which records a problem arising in a project and a measure management table which records a measure against a risk being a factor for occurrence of a problem in the project, and calculate as a front loading rate a ratio of the number of measures recorded in the measure management table to a sum of the number of problems recorded in the problem management table and the number of measures recorded in the measure management table;

processing to calculate a level of goal achievement for the front loading rate from a calculation result of the front loading rate and a target value of the front loading rate;

processing to set a display mode of the calculation result of the front loading rate in accordance with the level of goal achievement being calculated and perform control to display the calculation result on a display in the display mode being set; and processing to link a risk management table which records a risk being a factor for the occurrence of a problem in the project with a risk measure-to-do list such that a change to the risk management table in content automatically causes a change to corresponding content on the risk measure-to-do list.

* * * * *